Patented Nov. 9, 1948

2,453,566

UNITED STATES PATENT OFFICE 2,453,566

DIALKYL THIOACETALS OF CHOLESTANONE AND METHOD

Seymour Bernstein, Pearl River, and Louis Dorfman, New York, N. Y., assignors, by mesne assignments, to American Cyanamid Company, New York, N. Y., a corporation of Maine No Drawing. Application March 26, 1945, Serial No. 585,011

4 Claims. (Cl. 260—397.2)

The present invention relates to a new class of organic compounds. More particularly, the invention relates to 3-thioacetals of cyclopentanopolyhydrophenanthrenes and to methods of preparing the same.

We have found that when a 3-keto cyclopentanopolyhydrophenanthrene is mixed with a mercaptan in the presence of a dehydrating agent, reaction occurs resulting in the formation of a new class of organic compounds which may be designated as cyclopentanopolyhydrophenanthrene 3-thioacetals. The following equation showing the reaction of cholestanone-3 with ethyl mercaptan is a specific example of the type reaction:

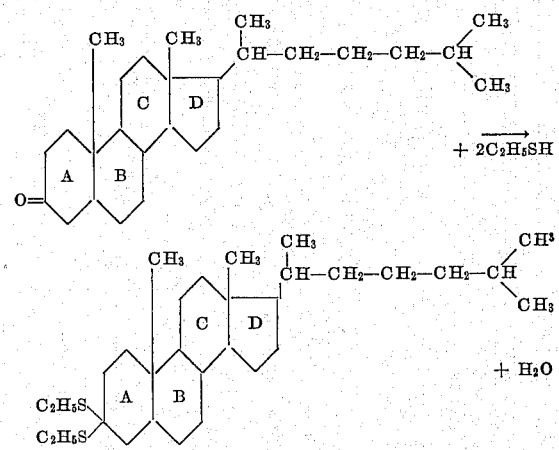

A great number of 3-keto cyclopentanopolyhydrophenanthrenes can be employed in the reaction shown above. Among these may be specifically mentioned: coprostanone-3, ergostanone-3, stigmastanone-3, pregnanedione-3,20, and the like.

We may also use as intermediates other cyclopentanopolyhydrophenanthrene compounds having in addition to a 3-keto group, a keto group, in the 7 or 11 position or in the 12 position a member of the group consisting of keto, hydroxy and alkoxy radicals. It may also have in the 17 position a radical such as hydroxy, ethoxy, hydroxyethyl, acetoxyethyl, or the normal bile acid side chain,

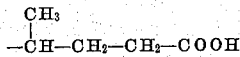

nor-bile acid side chain,

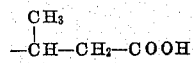

bisnor-bile acid side chain, $$-\overset{\mathrm{CH_3}}{\underset{|}{\mathrm{CH}}}-\mathrm{COOH}$$

or the etio side chain, —COOH either as the free acid or in the form of the corresponding esters.

The new compounds of the present invention may be illustrated by the following general formula:

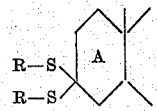

wherein R is an alkyl radical and A designates the A ring of a cyclopentanopolyhydrophenanthrene compound.

The compounds of the present invention, in general, are white solids although some are viscous oils. They are insoluble in water but soluble in most organic solvents such as ether, chloroform, carbon tetrachloride, etc. In general they have reasonably low melting points.

Mercaptans are well known compounds usually available as alkyl mercaptans such as, methyl mercaptan, ethyl mercaptan, propyl mercaptan, butyl mercaptan, isobutyl mercaptans, etc.

The reaction between 3-keto cyclopentanoperhydrophenanthrenes and mercaptans takes place at room temperature in the presence of dehydrating agents such as anhydrous sodium sulfate and fused zinc chloride or dry HCl, etc. In fact the reaction in most cases is slightly exothermic in character. The reaction is completed in from ½ to 24 hours, at temperatures of from about 1° C. to about 35° C. A convenient method of conducting the reaction is to mix the reactants with a dehydrating agent and allow the mixture to stand over night at room temperature or in a refrigerator.

The product is recovered from the reaction mixture by first removing the excess mercaptan in vacuo. The residue is mixed with water which dissolves the water soluble salts present. The product is then extracted with an organic solvent such as ether, chloroform, benzene, etc. The extract is purified by washing with water, dilute alkali and again with water until substantially neutral. After drying, the solvent is removed and the desired product is recrystallized from a solvent such as acetone, ethanol, methanol, etc. or mixture thereof.

The compounds of the present invention are useful as pharmaceuticals and as intermediates in the preparation of therapeutically useful steroids.

Our invention will now be illustrated in greater detail by means of the following specific example. It will be understood, of course, that this example is given for purposes of illustration and is not to be considered as limiting our invention to the particular details described therein.

*Example*

To 0.5 g. of cholestanone, 1 g. of anhydrous sodium sulfate and 0.5 g. of freshly fused zinc chloride, there was added 10 cc. of ethyl mercaptan. The sodium sulfate appeared wet after a very short time. The material was placed in the refrigerator overnight. The excess ethyl mercaptan was evaporated in vacuo. Water was added to the solid residue. The product was then worked up in ether. The ether extract was washed with water, dilute sodium hydroxide and finally with water until neutral. The ether solution was dried over anhydrous sodium sulfate and then evaporated in vacuo. The solid residue was recrystallized from acetone and alcohol. A yield of 0.5 g. of cholestanone-3 diethyl thioacetal was obtained.

A sample when recrystallized from dilute acetone had a melting point of 80°–82° C.

We claim:
1. Dialkyl thiocetals of cholestanone-3.
2. Diethyl thioacetal of cholestanone-3.
3. A method of preparing the diethyl thioacetal of cholestanone-3 which comprises mixing cholestanone-3 with ethyl mercaptan in the presence of a dehydrating agent.
4. A method of preparing dialkyl thioacetals of cholestanone-3 which comprises mixing cholestanone-3 with an alkyl mercaptan in the presence of a dehydrating agent.

SEYMOUR BERNSTEIN.
LOUIS DORFMAN.

REFERENCES CITED

The following references are of record in the file of this patent:

UNITED STATES PATENTS

| Number | Name | Date |
|---|---|---|
| 2,294,433 | Westphal | Sept. 1, 1942 |